(12) United States Patent
Sykes (10) Patent No.: US 11,280,245 B2
(45) Date of Patent: Mar. 22, 2022

(54) METHOD OF DETECTING A DOSER VALVE OPENING OR CLOSING EVENT

(71) Applicant: DELPHI TECHNOLOGIES IP LIMITED, St. Michael (BB)

(72) Inventor: Martin A. Sykes, Rainham (GB)

(73) Assignee: DELPHI TECHNOLOGIES IP LIMITED

( * ) Notice: Subject to any disclaimer, the term of this patent is extended or adjusted under 35 U.S.C. 154(b) by 200 days.

(21) Appl. No.: 16/500,824

(22) PCT Filed: Apr. 6, 2018

(86) PCT No.: PCT/EP2018/058912
§ 371 (c)(1),
(2) Date: Oct. 4, 2019

(87) PCT Pub. No.: WO2018/185314
PCT Pub. Date: Oct. 11, 2018

(65) Prior Publication Data
US 2020/0072113 A1   Mar. 5, 2020

(30) Foreign Application Priority Data

Apr. 6, 2017 (GB) .................................. 1705554.2

(51) Int. Cl.
*F01N 11/00* (2006.01)
*F01N 3/20* (2006.01)
(Continued)

(52) U.S. Cl.
CPC ............ *F01N 11/00* (2013.01); *F01N 3/2066* (2013.01); *F01N 9/00* (2013.01);
(Continued)

(58) Field of Classification Search
CPC ........ F01N 11/00; F01N 3/2066; F01N 3/208; F01N 3/206; F01N 9/00;
(Continued)

(56) References Cited

U.S. PATENT DOCUMENTS 5,835,330 A    11/1998   Kirschner et al.
7,418,957 B2 *  9/2008   Abe .................... F02D 41/1494
                                                123/697
(Continued)

FOREIGN PATENT DOCUMENTS

DE   102012209967 A1   12/2013
DE   102012216611 A1    4/2014
(Continued)

*Primary Examiner* — Phutthiwat Wongwian
*Assistant Examiner* — Sherman D Manley
(74) *Attorney, Agent, or Firm* — Joshua M. Haines (57) ABSTRACT

A method of detecting a valve opening or closing event in a solenoid operated reductant injector valve includes applying a voltage to the solenoid to actuate the valve, the voltage having a chopped waveform. A resultant current through the solenoid is sampled at local maxima and minima. Values of a difference between the local maxima and subsequent local minima or between local minima and subsequent local maxima are determined. A rate of change of the difference values are determined and a valve opening or closing event based on the rate of change is determined.

10 Claims, 10 Drawing Sheets

(51) Int. Cl.
*F01N 9/00* (2006.01)
*F02D 41/20* (2006.01)

(52) U.S. Cl.
CPC ...... *F01N 2900/1821* (2013.01); *F02D 41/20* (2013.01); *F02D 2041/2055* (2013.01); *F02D 2041/2058* (2013.01)

(58) Field of Classification Search
CPC ..... F01N 2900/1821; F01N 2900/1806; F01N 2610/02; F01N 2610/146; F01N 2610/1453; F01N 2610/01; F01N 2250/05; F01N 2250/04; F02D 2041/2058; F02D 2041/2055; F02D 2041/2027; F02D 41/20; F02M 21/0254; Y02T 10/12; Y02T 10/30; Y02T 10/40
See application file for complete search history.

(56) References Cited

U.S. PATENT DOCUMENTS

| | | | | |
|---|---|---|---|---|
| 7,685,810 B2* | 3/2010 | Hirata | ...................... | F01N 11/00 60/277 |
| 7,866,333 B2* | 1/2011 | Boe | ......................... | F01N 3/208 137/1 |
| 7,971,426 B2* | 7/2011 | Van Nieuwstadt | ..... | F01N 11/00 60/277 |
| 8,079,209 B2* | 12/2011 | Jung | ....................... | F01N 3/208 60/277 |
| 8,276,437 B2* | 10/2012 | Kitazawa | ................ | F01N 3/206 73/114.69 |
| 8,534,049 B2* | 9/2013 | Reinhold | ................ | F01N 3/208 60/286 |
| 9,606,023 B2 | 3/2017 | Peucat et al. | | |
| 10,851,695 B2* | 12/2020 | Xu | ............................ | F01N 3/28 |
| 2003/0033799 A1* | 2/2003 | Scheying | ........... | B01D 53/9495 60/286 |
| 2009/0132180 A1 | 5/2009 | Pearce et al. | | |
| 2010/0218484 A1* | 9/2010 | Arlt | ......................... | F01N 3/208 60/274 |
| 2011/0239625 A1* | 10/2011 | Fokkelman | ............... | F01N 3/208 60/274 |
| 2012/0260632 A1* | 10/2012 | Hodgson | ................. | F01N 3/206 60/274 |
| 2013/0240040 A1* | 9/2013 | Kleinknecht | ....... | F16K 31/0675 137/1 |
| 2015/0113950 A1 | 4/2015 | Qiao et al. | | |

FOREIGN PATENT DOCUMENTS

| | | |
|---|---|---|
| DE | 102015204545 A1 | 9/2016 |
| WO | 2016173774 A1 | 11/2016 |

* cited by examiner

METHOD OF DETECTING A DOSER VALVE OPENING OR CLOSING EVENT

CROSS REFERENCE TO RELATED APPLICATIONS

This application is a national stage application under 35 USC 371 of PCT Application No. PCT/EP2018/058912 having an international filing date of Apr. 6, 2018, which is designated in the United States and which claimed the benefit of GB Patent Application No. 1705554.2 filed on Apr. 6, 2017, the entire disclosures of each are hereby incorporated by reference in their entirety.

TECHNICAL FIELD

This invention relates to injector valves (dosers) used to inject a reductant such as urea into a vehicle exhaust system and in particular to a method to determine opening or closing events of the valve, such as for the purpose of detecting non-correctly operating dosers such as stuck injectors.

BACKGROUND OF THE INVENTION

In modern engine systems it is common for injectors to inject reductant such as urea into the exhaust system for controlling emissions. The injector is often referred to as a doser and the systems which use these are typically referred to a SCR (selective catalytic reduction) systems. Such injectors are typically solenoid actuated injectors; where activation of a solenoid operates a valve to allow injection of reductant such as urea into the exhaust system.

It is known to detect the state (stuck/not stuck) of the doser (reductant injector) by using e.g. the point of inflection in the current trace (current flowing through the injector solenoid) to determine a valid opening or closing event of the valve so as to provide an indication of the operational state of the doser valve. However where the applied voltage to the solenoid comprises a chopped waveform (resulting in a chopped current waveform) such an approach is difficult. It is an object of the invention to provide a method to obtain information with respect to the operational state of a solenoid operated reductant dosers where the solenoid is activated using a chopped voltage/current waveform.

SUMMARY OF THE INVENTION

In one aspect is provided a method of detecting a valve opening or closing event in a solenoid operated reductant injector valve comprising the steps of:
 a) applying a voltage to said solenoid to actuate said valve, said voltage having a chopped waveform;
 b) sampling the resultant current through the solenoid at local maxima and minima;
 c) determining values of the difference between local maxima and subsequent local minima or between local minima and subsequent local maxima;
 d) determining the rate of change of said difference values;
 e) determining a valve opening or closing event based on the rate of change in step d).

Step e) may comprise determining whether the magnitude of the rate of change of said values is above a threshold, and if so determining that there is a valve opening or closing event.

Step e) may comprises determining if there is a step increase or decrease in said difference values.

Said sampling step b) may be performed by synchronising the sampling times with the modulation signal with respect to the voltage drive.

The method may include determining the valve opening or closing time from said rate of change.

In a further aspect is provided a method of detecting a valve opening or closing event in a solenoid operated reductant injector valve comprising the steps of:
 a) applying a voltage to said solenoid to actuate said valve, said voltage having a chopped waveform;
 b) sampling the resultant current at local maxima or local minima;
 c) forming a plot from the values of step b);
 d) analyzing said plot to determine said valve opening and closing events.

Step d) may comprise determining the first or second derivatives of said plot and comparing these values to a threshold.

Step d) may include determining a glitch and determining a valve opening event therefrom.

Sampling step b) may be performed by synchronising the sampling times with the modulation signal with respect to the voltage drive.

BRIEF DESCRIPTION OF THE DRAWINGS

The present invention is now described by way of example with reference to the accompanying drawings in which.

DESCRIPTION OF THE PREFERRED EMBODIMENTS

Figure 1:
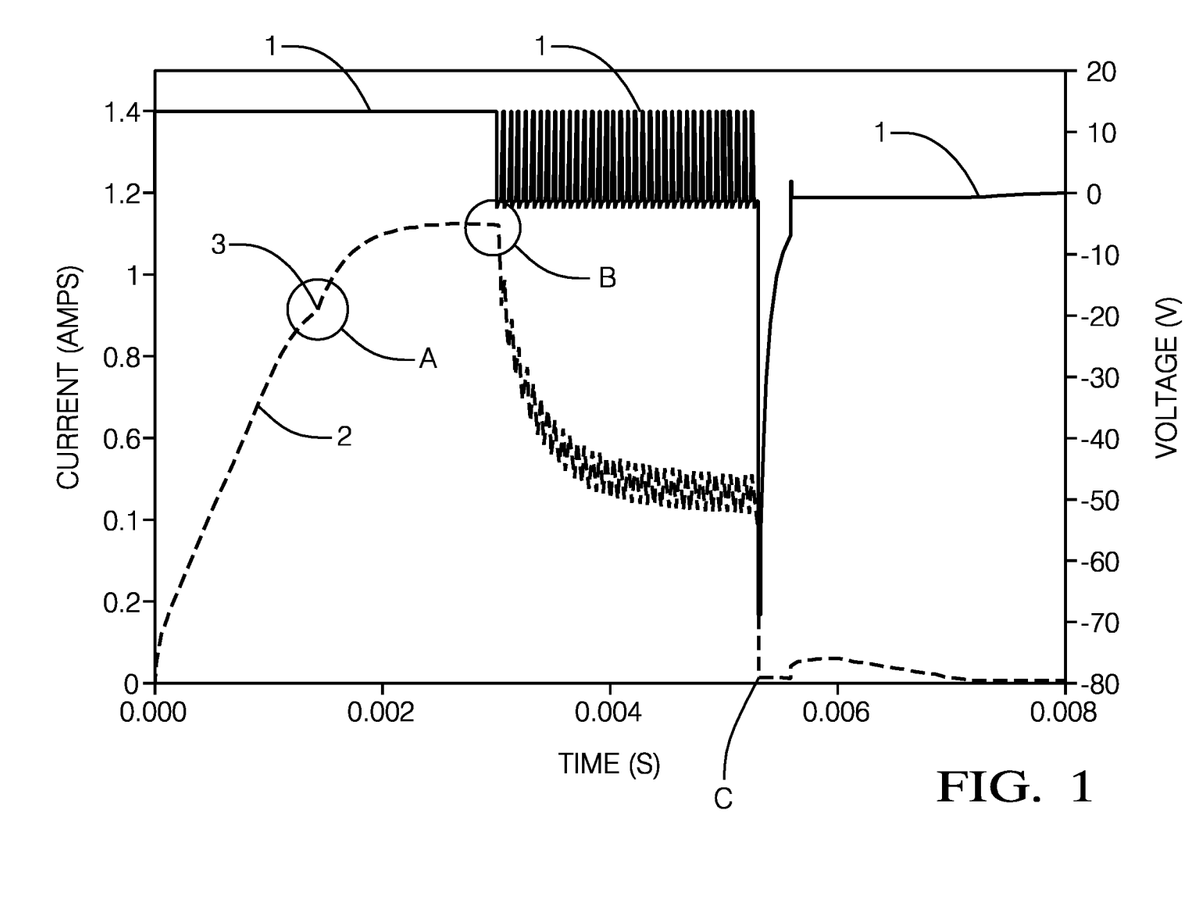
FIG. 1 shows a plot of both the voltage applied/present across the terminals of a reductant injector (solenoid) as well as the resultant current.

FIG. 1 shows a plot of both the voltage 1 applied/present across the terminals of a reductant injector (solenoid) as well as the resultant current 2 i.e. thought the doser (injector solenoid). As can be seen the doser is activated by providing an initial step increase in voltage. The current through the doser (injector solenoid) consequently ramps up to reach a peak value. During the time indicated by circle A, the injector opens. The current reaches a plateau value indicated by circle B, after which the voltage applied is chopped, to maintain the reductant injector in an open position. The current through the injector then begins to fall as shown in the plot. At time C the voltage across the injector is set negative and the doser begins to close; the current rapidly decreases to a level close to zero. So during this time the injector closes.

The trace of the current is often analysed to provide useful data. It is also known to infer the temperature of the doser from the resistance calculated from R=V/I at the point at the end of the pull in phase; i.e. at the plateau marked by circle B in FIG. 1. As shown in FIG. 1 there is a point of inflection/glitch 3 observed within circle A. The first and or second derivative of current can identify this glitch/point of infection. It is known to detect the state (stuck/not stuck) of the doser (reductant injector) by detecting the point of inflection/glitch in the current trace, which indicates of movement of the doser valve i.e. valve opening. The current flowing in the doser is entirely a function on the supply voltage and the electrical characteristics of the doser. So FIG. 1 shows the case for a typical supply voltage of 12v [8-16V] the supply to the doser during the pull in phase; the voltage applied is continuous.

Figure 2:
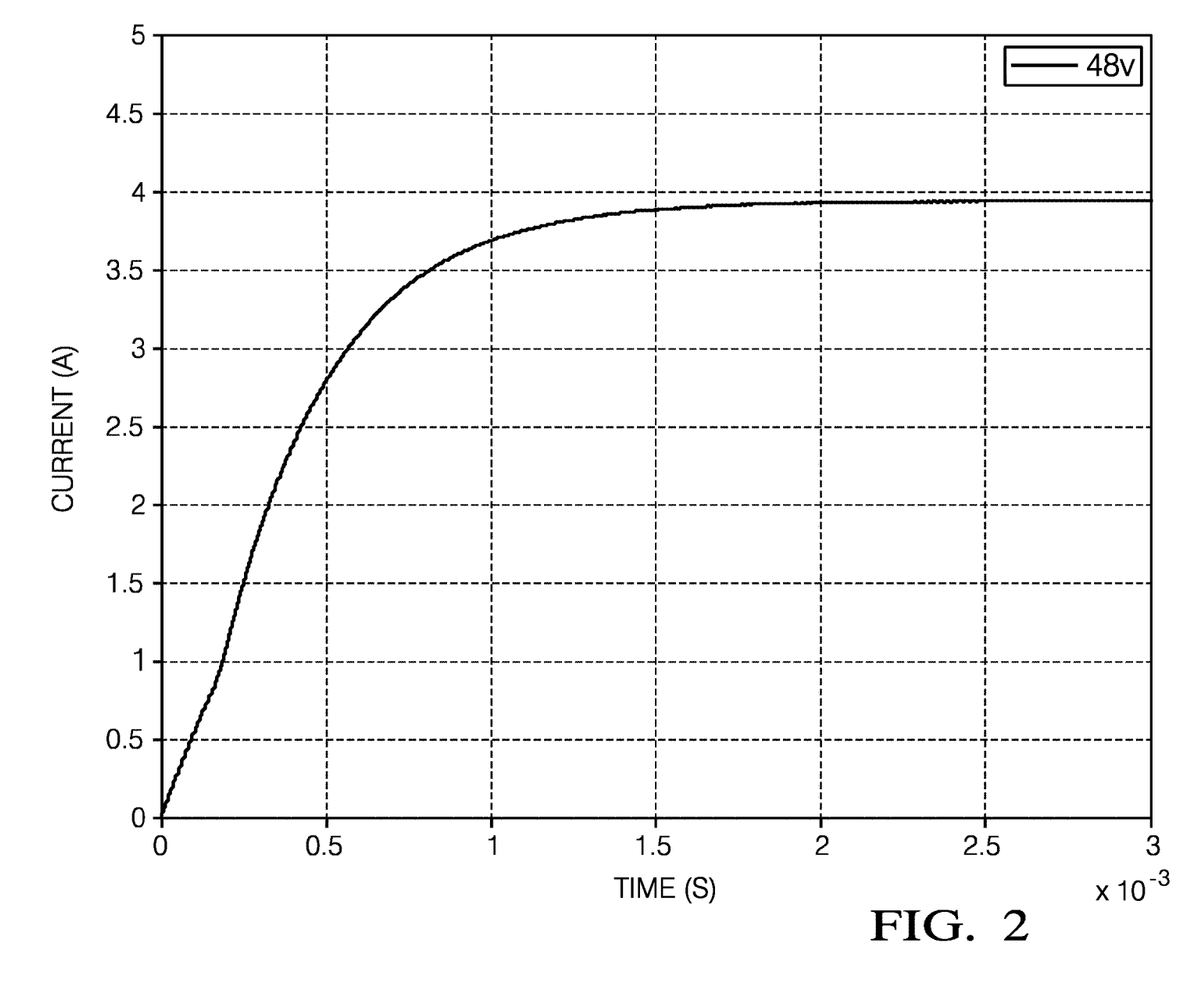
FIG. 2 show the increase in current through the solenoid due to operation at 48v.

Off highway vehicles often operate at 24v and it is expected that vehicle electrical systems will transition from 12v to 48 volt. This is due to the advantages of 48v supplies with mild hybrid powertrain systems. In such vehicles it is preferable not to have 24v/48v to 12v supply converters. Therefore it is desirable to drive components such as the SCR doser with 24v/48v rather than 12v. Operating the doser at 24v/48 volts continuously for the pull in phase would mean either high currents or a very short hold phase. FIG. 2 show the increase in current through the solenoid due to operation at 48v. Current increase will create undesirable additional heat generation.

Figure 3:
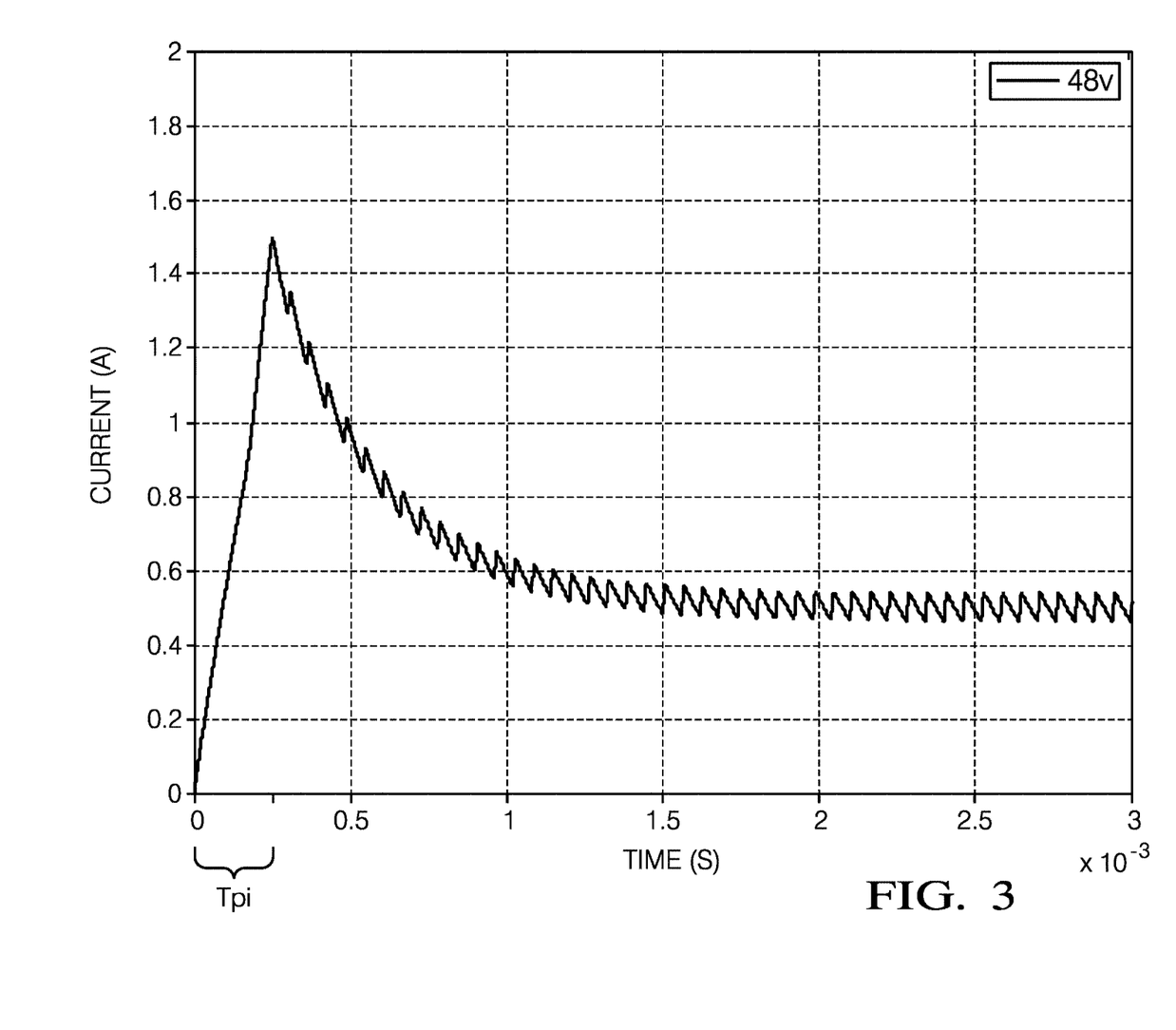
FIG. 3 shows the use of a short pull in phase.

FIG. 3 shows the use of a short pull in phase Tpi used to limit the current through the solenoid to acceptable limits. However this results in an unstable current to do the coil resistance. Although this could be done (limiting the current) during the hold phase, the accuracy would be compromised due to the low current levels.

Figure 4:
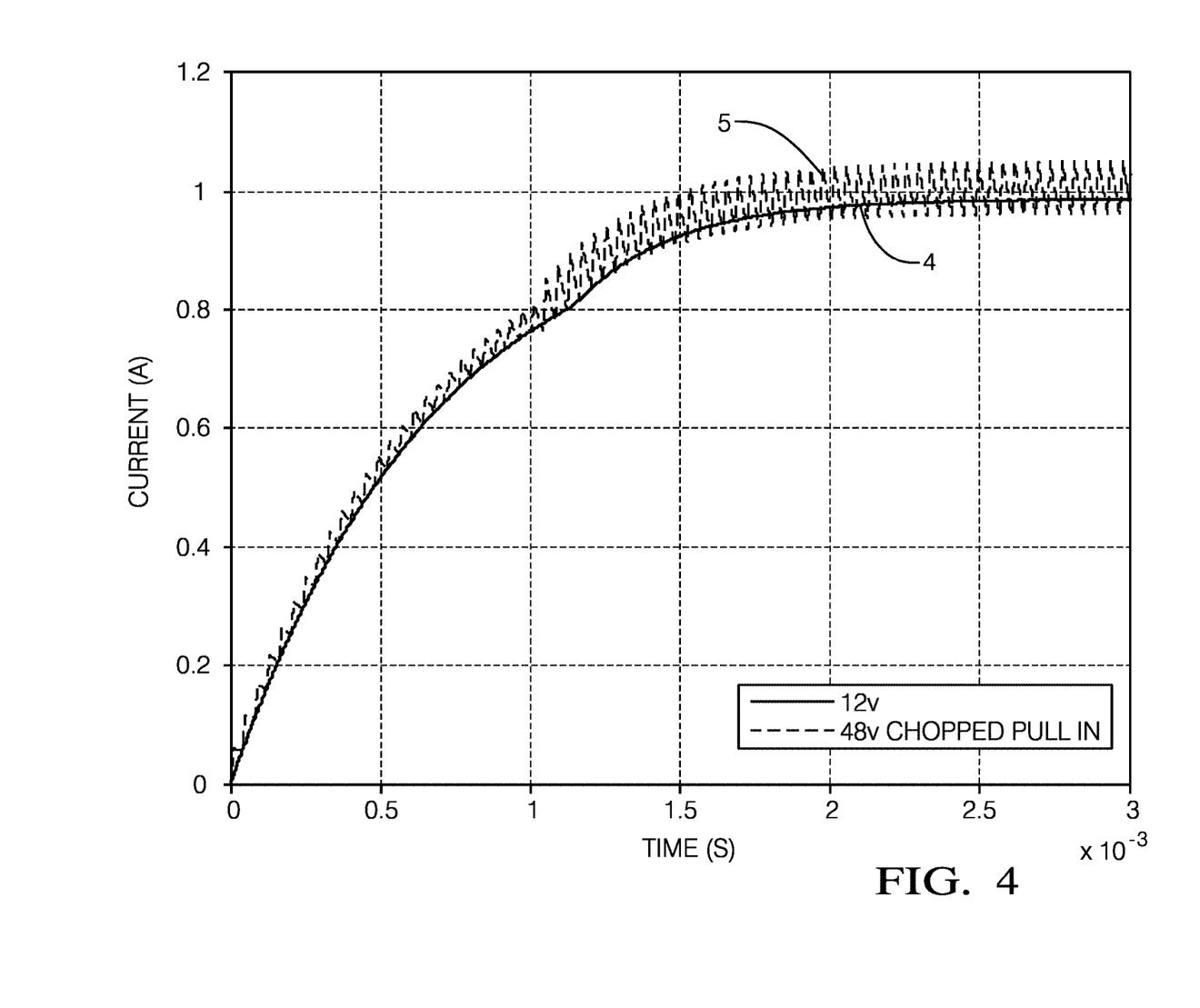
FIG. 4 shows the current plots during the pull in phase (opening phase) for a non-chopped 12V system, and a chopped pull in phase.

For higher voltage supply, the inventors have determined that the applied voltage can be chopped so as to produce a corresponding chopped waveform as shown in FIG. 4. This shows the current plots during the pull in phase (opening phase) fora non-chopped 12V system, 4, and a chopped pull in phase, 5.

Although the use of chopped waveforms have the aforementioned advantages, the problems with chopped methodology is that that detection of the doser opening point or start of injection (SOI) (inflexion point) using traditional methods will not work unless sampling is very fast. Both current waveforms in above figures have fast initial current rates. These will cause the doser to open faster. Hydraulically this will have some benefits but mechanically will introduce faster wear and impact the life of the product. In one example is a method to drive the doser at 24/48v and to chop the drive signal at 50/25% duty cycle effectively changing the drive voltage to 12v. FIG. 4 specifically shows current traces at 12 volts (not chopped) and 48 volts chopped at 25% duty-cycle 40 us period. However, to recap, this causes a problem with known Start of Injection (doser opening) detection methodology as the current signal cannot be sampled and processed in the traditional way.

In one aspect, the sampling is performed in synchronised fashion during the rising or falling drive logic of the e.g. pulse width modulated voltage drive waveform to the solenoid/injector. In this way, points of local maxima and/or minima are sampled and used in analysis to detect the start of injections. This may be done in various ways as will now be described.

Technique 1

Figure 5:
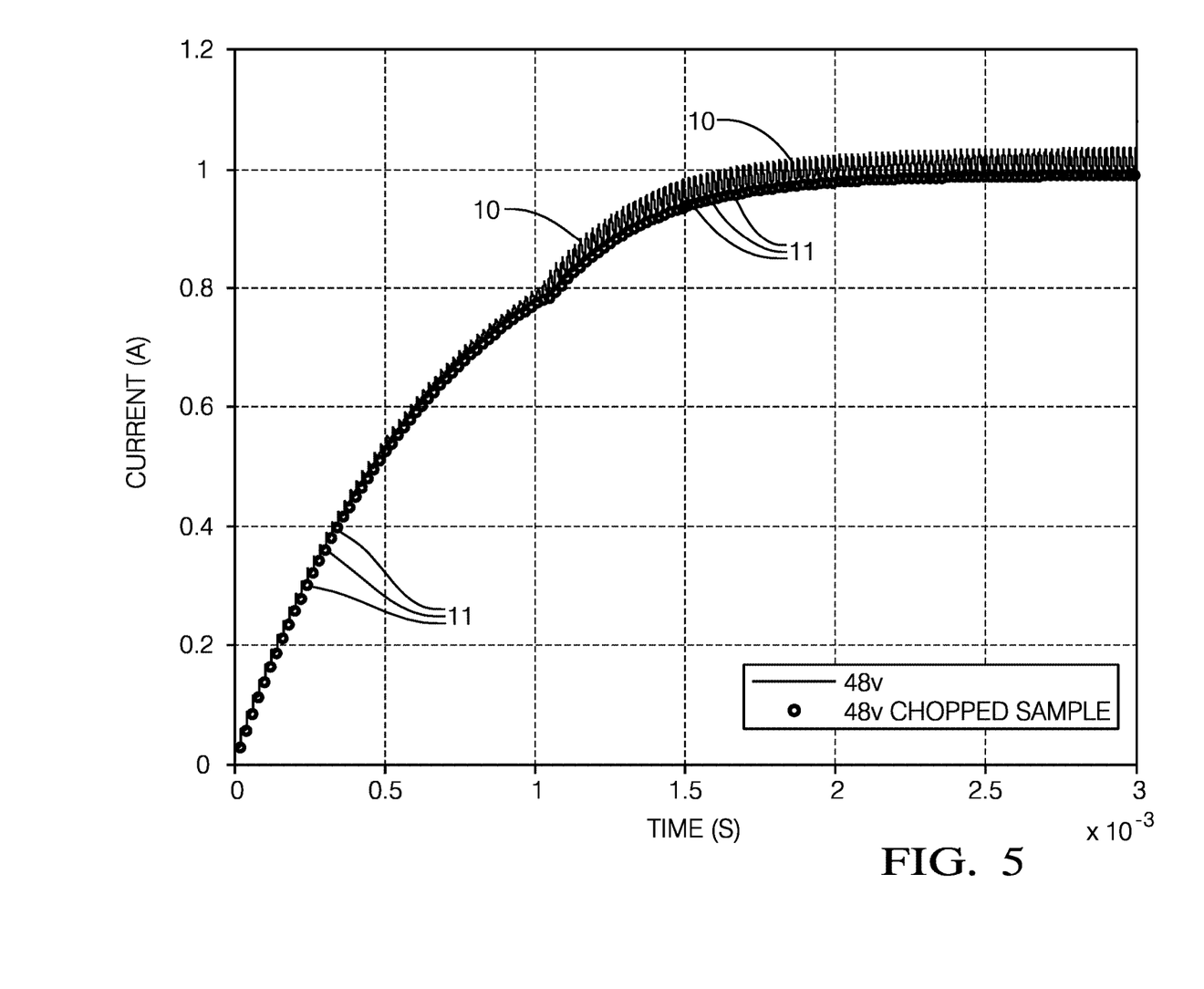
FIG. 5 shows plots of chopped current trace where the voltage applied is chopped, along with sample points.
Figure 6:
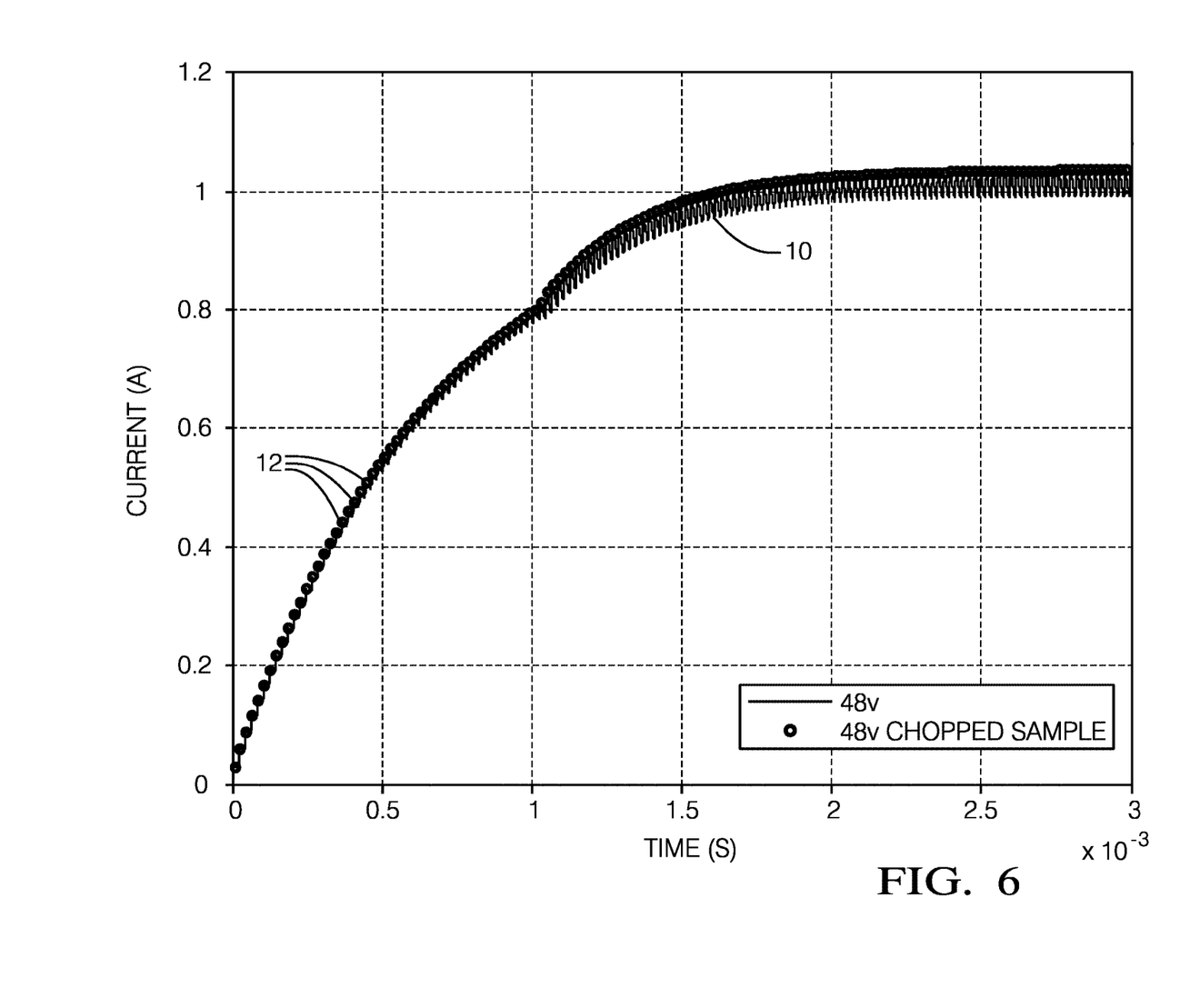
FIG. 6 is a similar graphic to FIG. 5 which shows the same current (chopped) trace where the sampling is performed to capture the current at local maxima (sampling points)

In one aspect the methodology the current is sampled in synchronised fashion during at the rising or falling drive logic with respect to the voltage (drive waveform) in order to capture points of local maxima and/or minima. These points are then used to provide a plot, where subsequent known analysis techniques are used e.g. to detect the start of injections by observation of glitches and such like. FIG. 5 shows and plots of current trace where the voltage applied is chopped: reference numeral 10 shows the current trace and the points 11 shows the sampling points from plot 10 which are taken and used in subsequent analysis. The sampling points 11 are taken at sampling times synchronised in the Pulse Width Modulation phase of the applied voltage where the current values are at local minima. FIG. 6 is a similar graphic which shows the same current (chopped) trace 10 where the sampling is performed to capture the current at local maxima (sampling points) 12—again this is achieved by syschronisation of the sampling being performed at the appropriate time in the PWM cycle.

In either case, curves/continuous plots can be derived from the sample points by joining the points of by any form of interpolation/curve fitting techniques. The start of injection point (doser opening) can then be determined from these plots of the points or the derived curves, using standard know techniques such as looking for points of inflection/glitches e.g. by looking at the first/second derivatives.

Technique 2

Figure 7A:
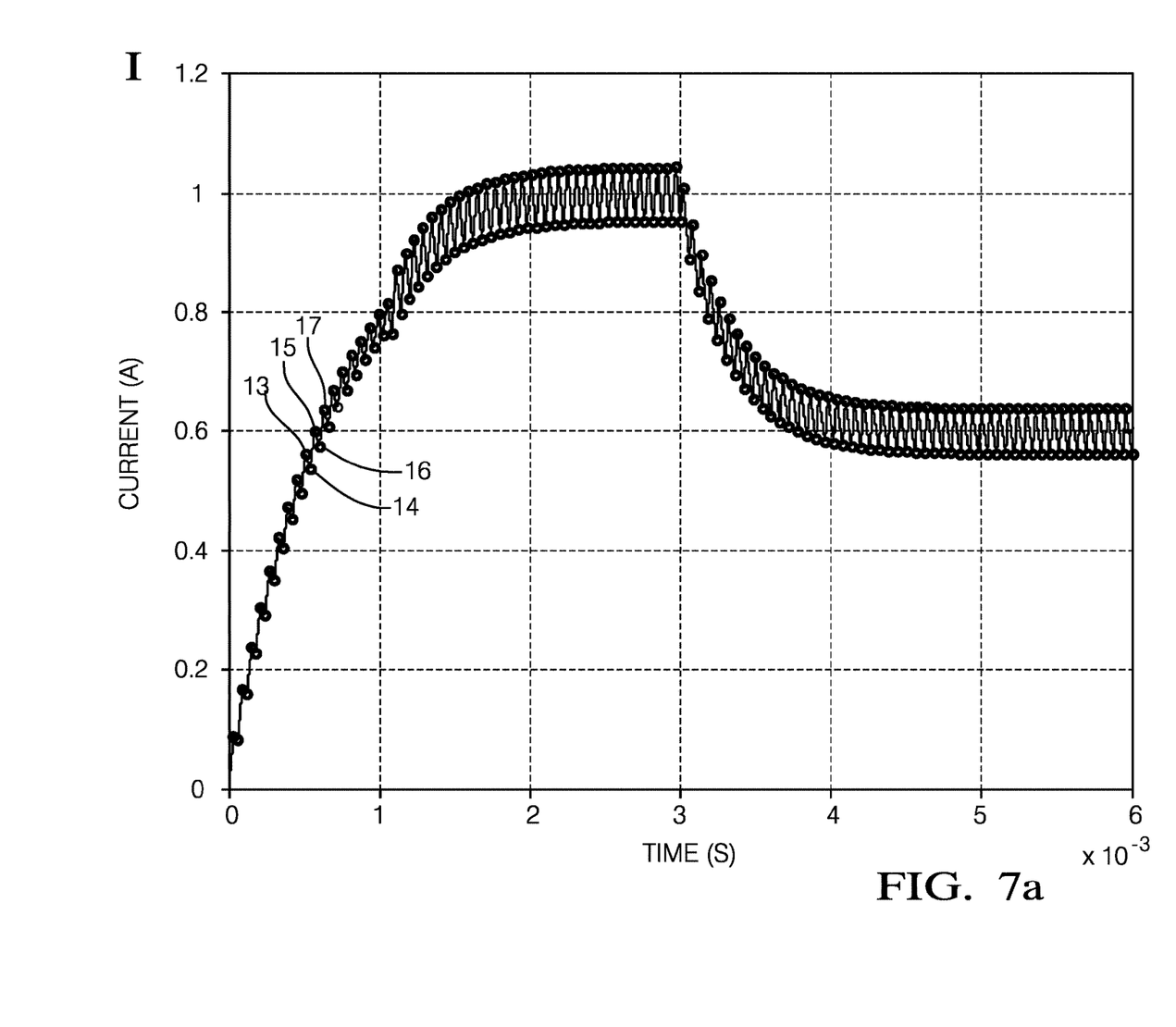
FIGS. 7a and 8a shows a plot of the (chopped) current similar to FIGS. 4 and 5 which showing the sampling points for both local maxima and local minima.
Figure 8A:
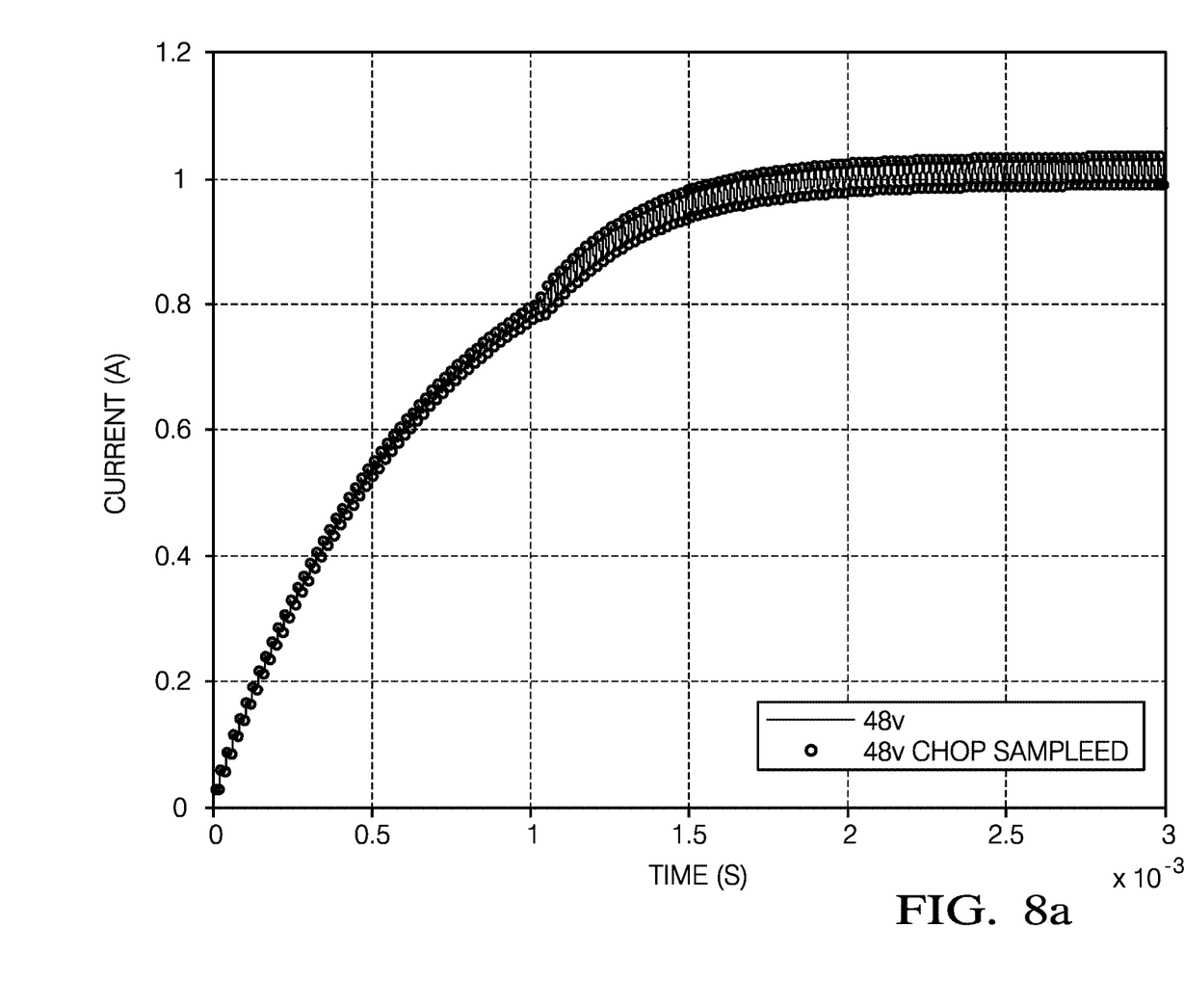

FIGS. 7a and 8a shows a plot of the (chopped) current similar to FIGS. 4 and 5 which showing the sampling points for both local maxima and local minima. In one method, again the current is sampled on rising and falling edges of the chopped current. In this technique a measure of the difference between local minima and subsequent local maxima (or between local maxima and subsequent local minima) are determined. In other words, the difference in values between a local minima and the subsequent local maxima is determined. These difference values may be plotted against time. Alternatively the difference in values between a local maxima and subsequent minimum is plotted. From the plots or from the changes in difference values with time, the start of opening (doser opening can be detected) as described below.

Figure 7B:
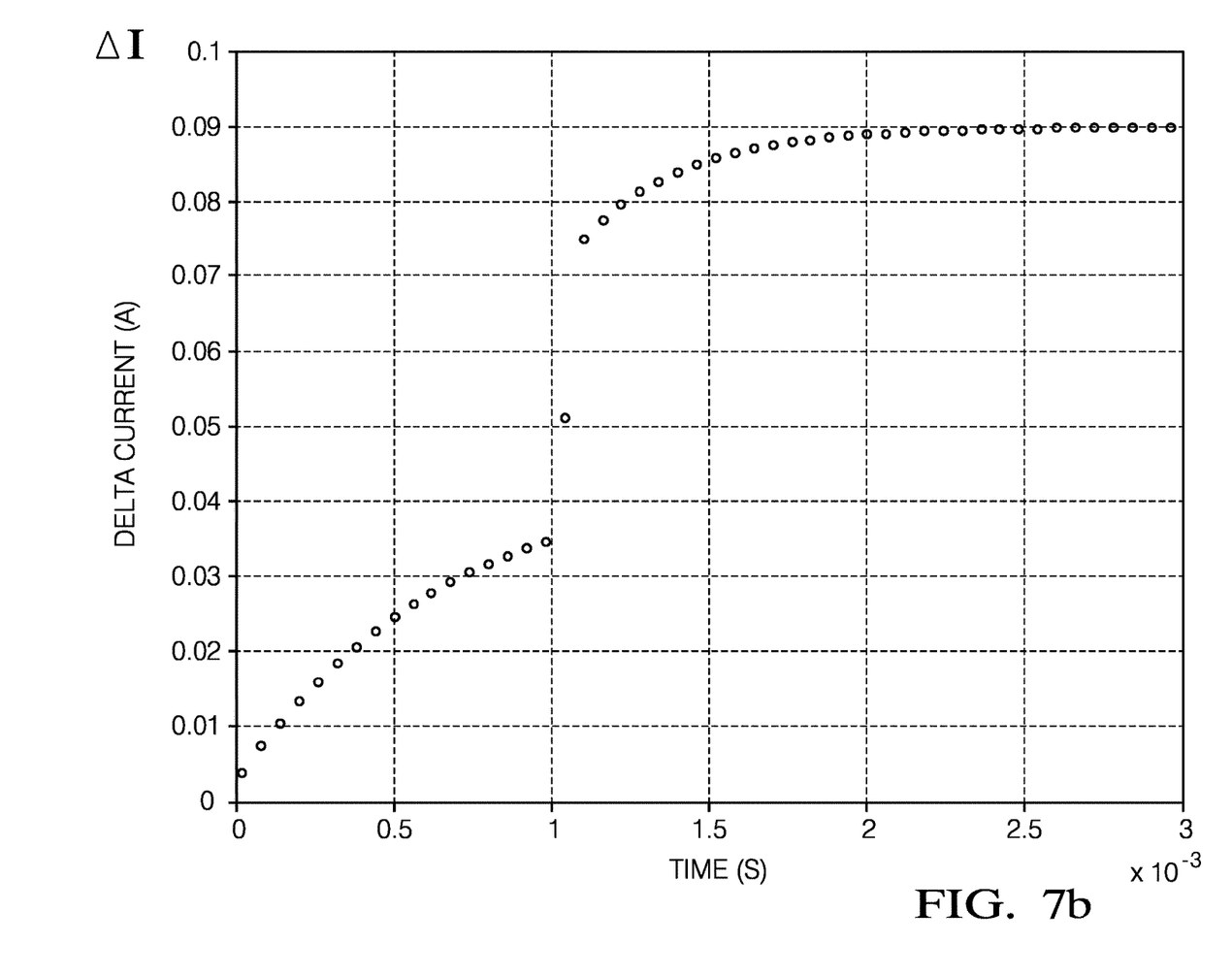
FIGS. 7b and 8b show plots of corresponding to FIGS. 7a and 8a respectively which shows a plot of delta current (ΔI) against time.
Figure 8B:
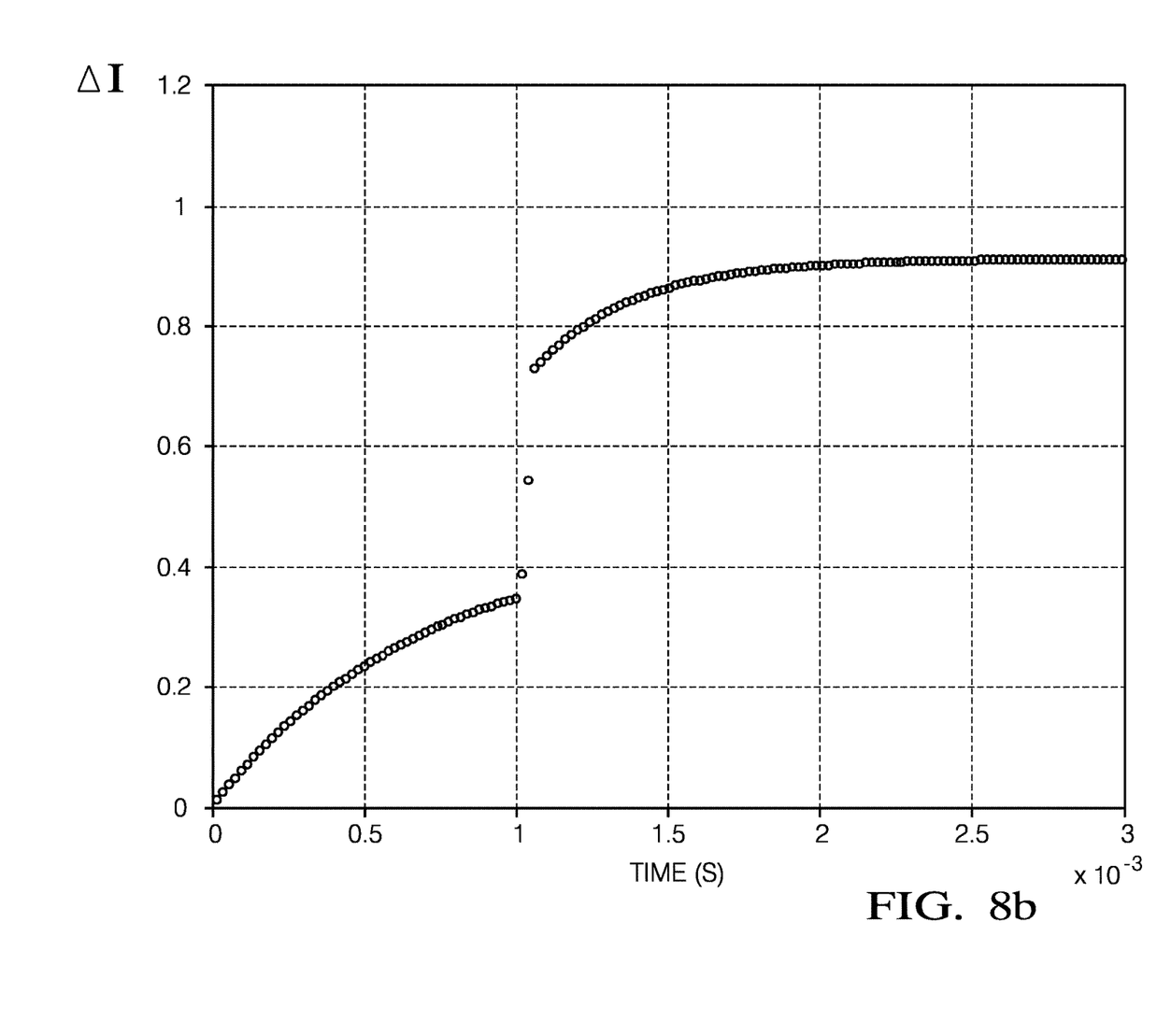

FIGS. 7b and 8b show plots of corresponding to FIGS. 7a and 8a respectively which shows a plot of delta current ($\Delta I$) against time. $\Delta I$ is the difference between adjacent minima and maxima of plots in 7a and 8a. As mentioned this alternative can be the difference between adjacent minima and maxima. So for example, for FIG. 7a, the value of $\Delta I$ are the values of e.g. difference in current between points 13 and 14, 15 and 16, etc. of plot 7a. Alternatively this may be the difference between point 14 and 15, 16 and 17 etc.

As can be seen when looking a $\Delta I$ over time there is a significant step increase in this difference value when the start of injection (doser opening occurs) at time T=1 second.

The step increase indicates a valve opening event and a step decrease indicated a valve closing event. In general the rate of change of the difference values may be analysed e.g. compared with a threshold to provide an indication of these event.

The invention claimed is:

1. A method of detecting a valve opening event or a valve closing event in a reductant injector valve having a solenoid which operates the reductant injector, the method comprising the steps of:

a) applying a voltage to said solenoid to actuate said reductant injector valve, said voltage having a chopped waveform as a result of applying a modulation signal to a voltage drive;
b) sampling a resultant current through the solenoid at local maxima and minima;
c) determining difference values between the local maxima and subsequent local minima or between the local minima and subsequent local maxima;
d) determining a rate of change of said difference values; and
e) determining the valve opening event or the valve closing event based on the rate of change in step d).

2. A method as claimed in claim 1 wherein step e) comprises determining whether a magnitude of the rate of change of said difference values is above a threshold, and if so, determining the valve opening event or the valve closing event.

3. A method as claimed in claim 2 where step e) comprises determining if there is a step increase or decrease in said difference values.

4. A method as claimed in claim 1 where step e) comprises determining if there is a step increase or decrease in said difference values.

5. A method as claimed in claim 1 wherein step b) is performed by synchronising sampling times with the modulation signal with respect to the voltage drive.

6. A method as claimed in claim 1 including determining a valve opening or closing time from said rate of change.

7. A method of detecting a valve opening or a valve closing in a reductant injector valve having a solenoid which operates the reductant injector valve, the method comprising the steps of:
a) applying a voltage to said solenoid to actuate said reductant injector valve, said voltage having a chopped waveform as a result of applying a modulation signal to a voltage drive;
b) sampling a resultant current at local maxima or local minima;
c) forming a plot from the sampling of step b); and
d) analyzing said plot to determine said valve opening or said valve closing;
wherein step b) is performed by synchronising sampling times with the modulation signal with respect to the voltage drive.

8. A method as claimed in claim 7 wherein step d) comprises determining first or second derivatives of said plot and comparing the first or second derivatives values to a threshold.

9. A method as claimed in claim 8 where step d) includes determining a glitch and determining the valve opening therefrom.

10. A method as claimed in claim 7 where step d) includes determining a glitch and determining the valve opening therefrom.

* * * * *